US006187262B1

(12) United States Patent
Cheng et al.

(10) Patent No.: US 6,187,262 B1
(45) Date of Patent: Feb. 13, 2001

(54) INHIBITION OF CORROSION IN AQUEOUS SYSTEMS

(75) Inventors: Longchun Cheng, Hopewell Township, NJ (US); Kim Whitaker, Philadelphia, PA (US)

(73) Assignee: Betzdearborn Inc., Trevose, PA (US)

( * ) Notice: Under 35 U.S.C. 154(b), the term of this patent shall be extended for 0 days.

(21) Appl. No.: 09/136,884

(22) Filed: Aug. 19, 1998

(51) Int. Cl.$^7$ .................................................. C23F 11/04
(52) U.S. Cl. ............................................. 422/16; 422/12
(58) Field of Search ................................ 422/11, 12, 16

(56) References Cited

U.S. PATENT DOCUMENTS

| | | | |
|---|---|---|---|
| 3,619,347 | * 11/1971 | Ireland, Jr. .......................... | 252/146 X |
| 3,860,464 | 1/1975 | Erdman et al. ...................... | 252/79.3 |
| 4,683,035 | 7/1987 | Hunt et al. .......................... | 204/777 |
| 4,758,312 | 7/1988 | Hunt et al. . | |
| 5,073,339 | * 12/1991 | Kreh ...................................... | 422/15 |
| 5,141,675 | * 8/1992 | Vanderpool et al. ............... | 422/16 X |
| 5,425,914 | * 6/1995 | Brown et al. ....................... | 422/12 X |
| 5,610,068 | 3/1997 | Stuart et al. ........................ | 436/6 |

FOREIGN PATENT DOCUMENTS 0237738   9/1987  (EP) .

OTHER PUBLICATIONS

Mostafa, Abo El–Khair B. "The Mechanism of Corrosion Inhibition of Copper by Triphenyl Tetrazolium Chloride in an Acidic Medium," Corrosion Prevention & Control, pp. 70–72, Jun. 1988.*
Gulil et al., Corrosion Prevention & Control, vol. 34, No. 6, 1987, pp. 149–151 and 159.
Marignier et al., Journal de chimie physique, vol. 85, No. 1, 1988, pp. 28.
Abdel–Wahab et al., Asian J. Chem., vol. 5, No. 4, pp. 1084–1090, 1993.
Abstract of DE 4218585.
Horner et al., Werkstoffe und Korrosion, 29, 654–664 (1978), which is includes an English language abstract.
Horner et al., Werkstoffe und Korrosion, 36, 545–553 (1985), which includes an English language abstract.
Abo El–Khair et al., "Inhibiting Effect of Triphenyl Tetrazolium Chloride on the Corrosion of Aluminum in HCI" Corrosion Prevention & Control, 1981, p. 7–10.
Aleya et al., "Inhibition of the Acid Corrosion of Iron with Triphenyl Tetrazolium Chloride," Corrosion Science, 1982, p. 717–22.

* cited by examiner

Primary Examiner—Robert J. Warden, Sr.
Assistant Examiner—Theresa T. Snider
(74) Attorney, Agent, or Firm—Greenblum & Bernstein P.L.C.

(57) ABSTRACT

A method for controlling corrosion of metals, particularly ferrous-based metals in contact with aqueous systems is disclosed, which includes treating industrial waters with a tetrazolium salt of the general formula:

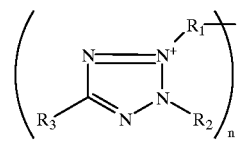

wherein $R_1$, $R_2$ and $R_3$ may be various organic or inorganic substituents, including monomers or oligomers of the above structure.

19 Claims, No Drawings

INHIBITION OF CORROSION IN AQUEOUS SYSTEMS

FIELD OF THE INVENTION

The present invention relates to the treatment of water to inhibit scale and control corrosion of metals in contact with aqueous systems. More particularly, the present invention relates to the use of tetrazolium salts to inhibit scale or prevent corrosion of ferrous-based metals in contact with aqueous systems.

BACKGROUND OF THE INVENTION

In industrial cooling systems, water such as from rivers, lakes, ponds, etc., is employed as the cooling media for heat exchangers. The cooling water from heat exchangers is typically passed through a cooling tower, spray pond or evaporative system prior to discharge or reuse. In these systems, the cooling effect is achieved by evaporating a portion of the water passing through the system. Because of the evaporation which takes place during cooling, dissolved materials in the water become concentrated, making the water more corrosive.

In cooling systems, corrosion causes two basic problems. The first and most obvious is the failure of equipment, resulting in replacement costs and plant downtime. Also, decreased plant efficiency occurs due to the loss of heat transfer. The accumulation of corrosion products causes heat exchanger fouling, resulting in the loss of heat transfer.

Ferrous-based metals, e.g., iron metal and metal alloys containing iron (mild steel), are routinely used in the construction of cooling systems due to their low cost and availability. As the system water passes over or through these ferrous-based metal containing devices, they are subjected to corrosion processes. Corrosion inhibitors are generally added as part of a water treatment program in cooling systems to prevent and inhibit the corrosion of ferrous-based metal containing devices.

Molybdates, zinc, phosphates or polyphosphates, and phosphonates have been used to inhibit the corrosion of ferrous-based metals in contact with the system water of cooling systems. Each treatment, however, presents certain drawbacks.

There exists a need, therefore, for a more environmentally acceptable corrosion inhibitor of ferrous-based metals in contact with aqueous systems.

Preventing the corrosion and scaling of industrial heat transfer equipment is essential to the efficient and economical operation of a cooling water system. Excessive corrosion of metallic surfaces can cause the premature failure of process equipment, necessitating downtime for the replacement or repair of the equipment. Additionally, the buildup of corrosion products on the heat transfer surface reduces efficiency, thereby limiting production or requiring downtime for cleaning.

SUMMARY OF THE INVENTION

The present invention provides an effective method for controlling corrosion of metals, particularly ferrous-based metals in contact with aqueous systems.

The method of the present invention comprises treating industrial waters with a tetrazolium salt of the general formula:

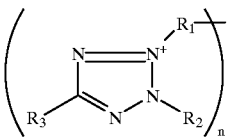

wherein $R_1$, $R_2$ and $R_3$ can be various organic and inorganic substituents, e.g., from the group consisting of lower alkyl, aryl, aralkyl, and heterocyclic substituted aryl with the proviso that neither $R_1$, $R_2$ or $R_3$ contain more than 14 carbon atoms, and n may be 1 or 2.

The compounds may contain positive or negative counter ions in order to balance the charges on the above structure. Chemical or electrochemical reduction of this type of compound produces tetrazolinyls and formazans that readily adsorb on metal surfaces and provide films for corrosion protection.

In aqueous systems, the following corrosion reactions of metals such as steel occur:

$$Fe \rightarrow Fe^{2+} + 2e^-$$

$$Fe(OH)_2 + OH^- \rightarrow Fe(OH)_3 + e^-$$

When tetrazolium compounds possessing redox potentials higher than that of the corroding metals or alloys are employed, reduction of tetrazolium molecules readily occur on the steel surface to form insoluble materials and, hence, prevent steel from further corrosion.

The invention will now be further described with reference to a number of specific examples which are to be regarded solely as illustrative and not as restricting the scope of the present invention.

DETAILED DESCRIPTION OF THE PREFERRED EMBODIMENTS

The film formation and corrosion inhibition activity of the treatment of the present invention was evaluated with a Beaker Corrosion Test Apparatus (BCTA). The BCTA includes a beaker equipped with an air/$CO_2$ sparge, low carbon steel (LCS) coupon, electrochemical probe and magnetic stirrer. The beaker is immersed in a water bath for temperature control. Electrochemical corrosion data were obtained using linear polarization resistance technique. All tests were conducted at 120° F., 400 RPM for 18 hours.

Compounds Tested

| Compound | $R_1$ | $R_2$ | $R_3$ | n |
|---|---|---|---|---|
| NBT | $CH_3OC_6H_3$ | $NO_2C_6H_4$ | $C_6H_5$ | 2 |
| INT | $IC_6H_4$ | $NO_2C_6H_4$ | $C_6H_5$ | 1 |
| TZV | $C_{10}H_7$ | $C_6H_5$ | $C_6H_5$ | 1 |
| TTC | $C_6H_5$ | $C_6H_5$ | $C_6H_5$ | 1 |

NBT: 3,3'(3,3'-dimethoxy-4,4'-biphenylene)-bis-[2-(p-nitrophenyl)-5-phenyl-2H-tetrazolium chloride]
INT: 2-(4-iodophenyl)-3-(4-nitrophenyl)-5-phenyl tetrazolium chloride
TZV: 2,5-diphenyl-3-(1-naphthyl)-2H-tetrazolium chloride
TTC: 2,3,5-triphenyl-2H-tetrazolium chloride

EXAMPLE 1

Testing Water: 250 ppm Ca (as $CaCO_3$), 125 ppm Mg (as $CaCO_3$), 10 ppm $SiO_2$ (as $SiO_2$), 300 ppm Cl, 200 ppm $SO_4$ 7.5 ppm Polyepoxysuccinic Acid (PESA)

7.5 ppm Copolymer of acrylic acid and allylhydroxypropylsulfonate ether sodium salt (AA/AHPSE)

Corrosion rate results are summarized in Table 1 for low carbon steel in blank testing water and in testing water containing inhibitor Nitro Blue Tetrazolium chloride monohydrate (NBT) and 2-(4-iodophenyl)-3-(4-nitrophenyl)-5-phenyl tetrazolium chloride (INT).

TABLE 1

| Treatment | ppm Active | pH | m-Alk (ppm as $CaCO_3$) | Avg. Corrosion Rate (mpy) |
|---|---|---|---|---|
| Blank | — | 8.4 | 90 | 38.4 |
| NBT | 20 | 8.4 | 90 | 2.06 |
| INT | 20 | 8.4 | 90 | 8.00 |

EXAMPLE 2

Testing Water: 100 ppm Ca (as $CaCO_3$), 50 ppm Mg (as $CaCO_3$), 100 ppm Cl, 100 ppm $SO_4$, 5 ppm PESA.

Corrosion rate results are summarized in Table 2 for low carbon steel in testing water containing inhibitor 2,5-diphenyl-3-(1-naphthyl)-2H-tetrazolium chloride (tetrazolium violet, or TZV), nitro blue tetrazolium chloride monohydrate (NBT), and 2-(4-iodophenyl)-3-(4-nitrophenyl)-5-phenyltetrazolium chloride (INT).

TABLE 2

| Treatment | ppm Active | pH | m-Alk (ppm as $CaCO_3$) | Avg. Corrosion Rate (mpy) |
|---|---|---|---|---|
| Blank | — | 8.6 | 375 | 35.5 |
| TZV | 2 | 8.6 | 375 | 18.7 |
| TZV | 20 | 8.6 | 375 | 3.68 |
| NBT | 20 | 8.6 | 375 | 2.64 |
| INT | 20 | 8.6 | 375 | 3.19 |

EXAMPLE 3

Testing Water: 100 ppm Ca (as $CaCO_3$), 50 ppm Mg (as $CaCO_3$), 100 ppm Cl, 100 ppm $SO_4$, 5 ppm PESA, 5 ppm AA/AHPSE.

Corrosion rate results are summarized in Table 3 for low carbon steel in testing water containing inhibitor 2,5-diphenyl-3-(1-naphthyl)-2H-tetrazolium chloride (Tetrazolium Violet, TZV) and 2,3,5-triphenyl-2H-tetrazolium chloride (TTC).

TABLE 3

| Treatment | ppm Active | pH | m-Alk (ppm as $CaCO_3$) | Avg. Corrosion Rate (mpy) |
|---|---|---|---|---|
| Blank | — | 8.6 | 375 | 23.1 |
| TZV | 20 | 8.6 | 375 | 3.48 |
| TZV | 0 | 8.6 | 375 | 1.48* |
| TTC | 20 | 8.6 | 375 | 12.1 |
| TTC | 50 | 8.6 | 375 | 8.2 |
| Blank | — | 7.6 | 32 | 45.5 |
| TZV | 50 | 7.6 | 32 | 22.2 |
| TTC | 20 | 7.6 | 32 | 42.6 |
| TTC | 50 | 7.6 | 32 | 40.1 |
| Blank | — | 6.8 | 4 | 85.3 |
| TZV | 50 | 6.8 | 4 | 33.2 |
| TTC | 20 | 6.8 | 4 | 58.5 |
| TTC | 50 | 6.8 | 4 | 62.3 |

*LCS was treated with 20 ppm TZV for 18 hours before tested in this water without TZV.

The treatment of the present invention can be added either continuously or intermittently. The compound can be used as a pretreatment to passivate the metal surfaces prior to whatever application chosen.

EXAMPLE 4

Testing Water: 100 ppm Cl, 100 ppm $SO_4$

Corrosion rate results are summarized in Table 4 for low carbon steel in testing water containing inhibitor 2,5-diphenyl-3-(1-naphthyl)-2H-tetrazolium chloride (tetrazolium violet, TZV), nitro blue tetrazolium chloride monohydrate (NBT), and 2-(4-iodophenyl)-3-(4-nitrophenyl)-5-phenyltetrazolium chloride (INT).

TABLE 4

| Treatment | ppm Active | pH | m-Alk (ppm as $CaCO_3$) | Avg. Corrosion Rate (mpy) |
|---|---|---|---|---|
| Blank | — | 8.6 | 342 | 83 |
| TZV | 2 | 8.6 | 342 | 20.9 |
| TZV | 20 | 8.6 | 342 | 4.92 |
| NBT | 20 | 8.6 | 342 | 9.18 |
| INT | 20 | 8.6 | 342 | 6.95 |
| Blank | — | 7.6 | 31 | 126 |
| TZV | 2 | 7.6 | 31 | 116 |
| TZV | 20 | 7.6 | 31 | 16.3 |

In bench top recirculating unit (BTU) tests, the BTU units were designed to measure the ability of the treatment to prevent corrosion and scale formation. The treated water is circulated through a by-pass rack, into which corrosion coupons and probes are inserted, and passes through a heat exchange tube. The velocity of water passing through the unit can be controlled in the range of from about 0 to 4.5 ft/sec. Corrosion rates were obtained using linear polarization measurement of LCS probes. Stainless steel probes were used as counter electrode and reference electrode.

Results of LCS corrosion rate during a 7 day test under the following conditions are summarized in Table 5.

Testing Water: 100 ppm Ca (as $CaCO_3$), 50 ppm Mg (as $CaCO_3$), 100 ppm Cl, 100 ppm $SO_4$, 5 ppm PESA, 5 ppm AA/AHPSE.

Bulk water temperature: 120° F.
Flow rate: 4 ft/sec.

TABLE 5

| Treatment | Dosage (ppm active) Shot/Continuous | pH | m-Alk (ppm as $CaCO_3$) | Avg. Corrosion Rate (mpy) |
|---|---|---|---|---|
| NBT | 50/10 | 7.6 | 32 | 0.57 |
| NBT | 25/5 | 8.6 | 375 | 1.90 |

In a preferred embodiment of the present invention, the compound is added to the aqueous system at active treatment levels ranging from about 0.1 to about 50 parts per million, with treatment levels of from about 1 to about 25 parts per million particularly preferred.

Systems capable of benefiting from the treatments of the present invention include cooling water systems, steam generating systems, gas scrubbing systems, and pulping and papermaking systems. The pH of the aqueous system to be treated is about 6 or greater.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method of controlling the corrosion of ferrous based metals in contact with an aqueous system at a pH of about 6 or greater which comprises introducing into said aqueous system a compound of the formula:

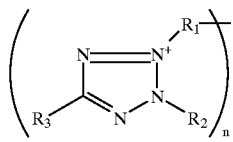

wherein $R_1$, $R_2$ and $R_3$ are selected from the group consisting of lower alkyl, aryl, aralkyl and heterocyclic substituted aryl, with the proviso that neither $R_1$, $R_2$ or $R_3$ contain more than 14 carbon atoms; and n is 1 or 2.

2. The method as recited in claim 1 wherein said aqueous system is a cooling water system.

3. The method as recited in claim 1 wherein said compound is added to the aqueous system at active treatment levels ranging from about 0.1 to about 50 parts per million.

4. The method as recited in claim 3 wherein said compound is added to the aqueous system at active treatment levels ranging from about 1 to about 25 parts per million.

5. The method as recited in claim 1 wherein said aqueous system is a steam generating system.

6. The method as recited in claim 1 wherein said aqueous system is a gas scrubbing system.

7. The method as recited in claim 1 wherein said aqueous system is a pulping and papermaking system.

8. The method as recited in claim 1 wherein the compound is added continuously to said aqueous system.

9. The method as recited in claim 1 wherein the compound is added intermittently to said aqueous system.

10. The method as recited in claim 1 wherein the ferrous based metal comprises steel.

11. The method as recited in claim 1 wherein the compound comprises at least one of:

3,3'-(3,3'-dimethoxy-4,4'-biphenylene)-bis-[2-(p-nitrophenyl)-5-phenyl-2H-tetrazolium chloride];

2-(4-iodophenyl)-3-(4-nitrophenyl)-5-phenyl tetrazolium chloride;

2,5-diphenyl-3-(1-naphthyl)-2H-tetrazolium chloride; and 2,3,5-triphenyl-2H-tetrazolium chloride.

12. The method as recited in claim 11 wherein the compound comprises 3,3'-(3,3'-dimethoxy-4,4'-biphenylene)-bis-[2-(p-nitrophenyl)-5-phenyl-2H-tetrazolium chloride].

13. The method as recited in claim 12 wherein the ferrous based metal comprises steel.

14. The method as recited in claim 11 wherein the compound comprises 2-(4-iodophenyl)-3-(4-nitrophenyl)-5-phenyl tetrazolium chloride.

15. The method as recited in claim 14 wherein the ferrous based metal comprises steel.

16. The method as recited in claim 11 wherein the compound comprises 2,5-diphenyl-3-(1-naphthyl)-2H-tetrazolium chloride.

17. The method as recited in claim 16 wherein the ferrous based metal comprises steel.

18. The method as recited in claim 11 wherein the compound comprises 2,3,5-triphenyl-2H-tetrazolium chloride.

19. The method as recited in claim 18 wherein the ferrous based metal comprises steel.

* * * * *